US006887373B2

(12) United States Patent
McCoy

(10) Patent No.: US 6,887,373 B2
(45) Date of Patent: May 3, 2005

(54) WATER TREATMENT SYSTEM

(75) Inventor: Brian McCoy, 11 Monterey Ave., Sandston, VA (US) 23150

(73) Assignee: Brian McCoy, Sandston, VA (US)

( * ) Notice: Subject to any disclaimer, the term of this patent is extended or adjusted under 35 U.S.C. 154(b) by 50 days.

(21) Appl. No.: 10/350,873

(22) Filed: Jan. 27, 2003

(65) Prior Publication Data

US 2004/0144727 A1 Jul. 29, 2004

(51) Int. Cl.$^7$ .............................................. B01D 24/14
(52) U.S. Cl. ....................... 210/136; 210/202; 210/288; 210/290
(58) Field of Search ................................. 210/136, 143, 210/202, 209, 218, 258, 259, 266, 290, 274, 288

(56) References Cited

U.S. PATENT DOCUMENTS

| | | | | |
|---|---|---|---|---|
| 3,649,532 A | * | 3/1972 | McLean | ...................... 210/718 |
| 4,430,228 A | * | 2/1984 | Paterson | ...................... 210/665 |
| 5,007,994 A | * | 4/1991 | Snee | ........................... 204/240 |
| 5,096,580 A | * | 3/1992 | Auchincloss | ................. 210/202 |
| 5,147,530 A | * | 9/1992 | Chandler et al. | .............. 210/90 |

* cited by examiner

Primary Examiner—Ivars C. Cintins
(74) Attorney, Agent, or Firm—Floyd Scheier

(57) ABSTRACT

A method, system and apparatus for treating water is provided including a treatment mode comprising the steps of drawing said water from a pressurized water source through a controlling device to a treating vessel, the water inlet of said treating vessel being substantially at the top of a treating vessel, contacting said water with pressurized air present at the top of said treating vessel to release substantially all hydrogen sulfide and offensive odors present in the water and to dissolve oxygen in the water which reacts with soluble iron in the water to form ferric oxides, flowing the water through a filter bed of calcite mineral to remove substantially all sediment present in the water and to neutralize the ph of the water and to remove substantially all the ferric oxides from the water, the ferric oxides fastening to the calcite minerals and to already fastened ferric oxides, flowing the water to a final media means and to the outlet of the treating vessel.

4 Claims, 4 Drawing Sheets

WATER TREATMENT SYSTEM

BACKGROUND OF INVENTION

The invention relates to a method, system and apparatus for treating water including a treatment mode comprising the steps of drawing said water from a pressurized water source through a controlling device to a treating vessel, the water inlet of said treating vessel being substantially at the top of a treating vessel, contacting said water with pressurized air present at the top of said treating vessel to release substantially all hydrogen sulfide and offensive odors present in the water and to dissolve oxygen in the water which reacts with soluble iron in the water to form ferric oxides, flowing the water through a filter bed of calcite mineral to remove substantially all sediment present in the water and to neutralize the ph of the water and to remove substantially all the ferric oxides from the water, the ferric oxides fastening to the calcite minerals and to already fastened ferric oxides, flowing the water to a final media means and to the outlet of the treating vessel and through the controlling device to a potable water plumbing system connected thereto.

BRIEF SUMMARY OF THE INVEVTION

It is therefor an object of this invention to provide a water treatment method, system and apparatus to effectively and efficiently remove substantially all offensive and malodorous contaminants and gases contained in ground water for use in a potable water system.

It is yet another object of this invention to provide a water treatment method, system and apparatus to effectively and efficiently remove substantially all ferrous bicarbonate, ferric hydroxide, hydrogen sulfide, odors, sediment, acidity and small amounts of manganese from ground water using a single combination aeration treatment vessel.

The prior art is replete with all types of water treatment systems, methods apparatus that are susceptible to clogging caused primarily by oxidized iron fastening to the interior surfaces of the several system components. This results primarily from the air induction of the iron laden water from the well into the pressure and aeration tanks. It is well known that the consequences of the "coating" or fastening of oxidized iron to the interior surfaces of system components include restricted flow and diminished efficiency of the several system components. Ultimately, the entire system must be dismantled and cleaned or replaced.

U.S. Pat. No. 3,649,532 to McLean is an example of such a approach of introducing the water into an aerator device. Air is entrained and mixed by turbulence into the water in a significant quantity, the water sucking air into the aerator device as it flows into the pressure tank. This air entrained water will initiate the forming of oxidized iron fastening to the interior surfaces of the several system components of the McLean system.

Similarly, U.S. Pat. No. 5,147,530 discloses a complicated loop system of treating well water in which a venturi nozzle mixes air into water during the entire pump cycle.

BRIEF DESCRIPTION OF THE DRAWINGS

The above and other objects, features and advantages will be more clearly understood and appreciated from the following Detailed Description of the preferred embodiment of the present invention when taken in conjunction with the accompanying drawings which illustrate the Water Treatment System of the present invention wherein.

DETAILED DESCRIPTION

Referring now to the Figures there is shown a Water Treatment System 10 which is particularly adapted to provide potable to an associated plumbing system (not shown).

The Water Treatment System 10 is fluidly connected by inlet line 12 to pressurized source such as a submersible well pump (not shown). The inlet line is fluidly connected via a check valve 14 to a control valve 16.

The operation of the well pump could be controlled by a cut-in, cut-out pressure switch (not shown) which senses the fluid pressure downstream of the well pump, all as well known in the prior art.

The Water Treatment System 10 is fluidly connected by outlet line 20, at the control valve 16, to an associated potable water plumbing system (not shown).

Control valve 16 may be selected from a wide variety of control valves such as the 2510 Econominder (T.M. of the Fleck Company) as manufactured by the Fleck Company. The control valve 16 may be used as manufactured except for several modifications which will be discussed further below.

The control valve 16 automatically controls the flow of water and time durations during the four modes of operation of the present invention and is typically an electro-mechcanically driven device as is the 2510 Econominder. As such, it is electrically connected to 115 volt receptacle (not shown).

Figure 1:
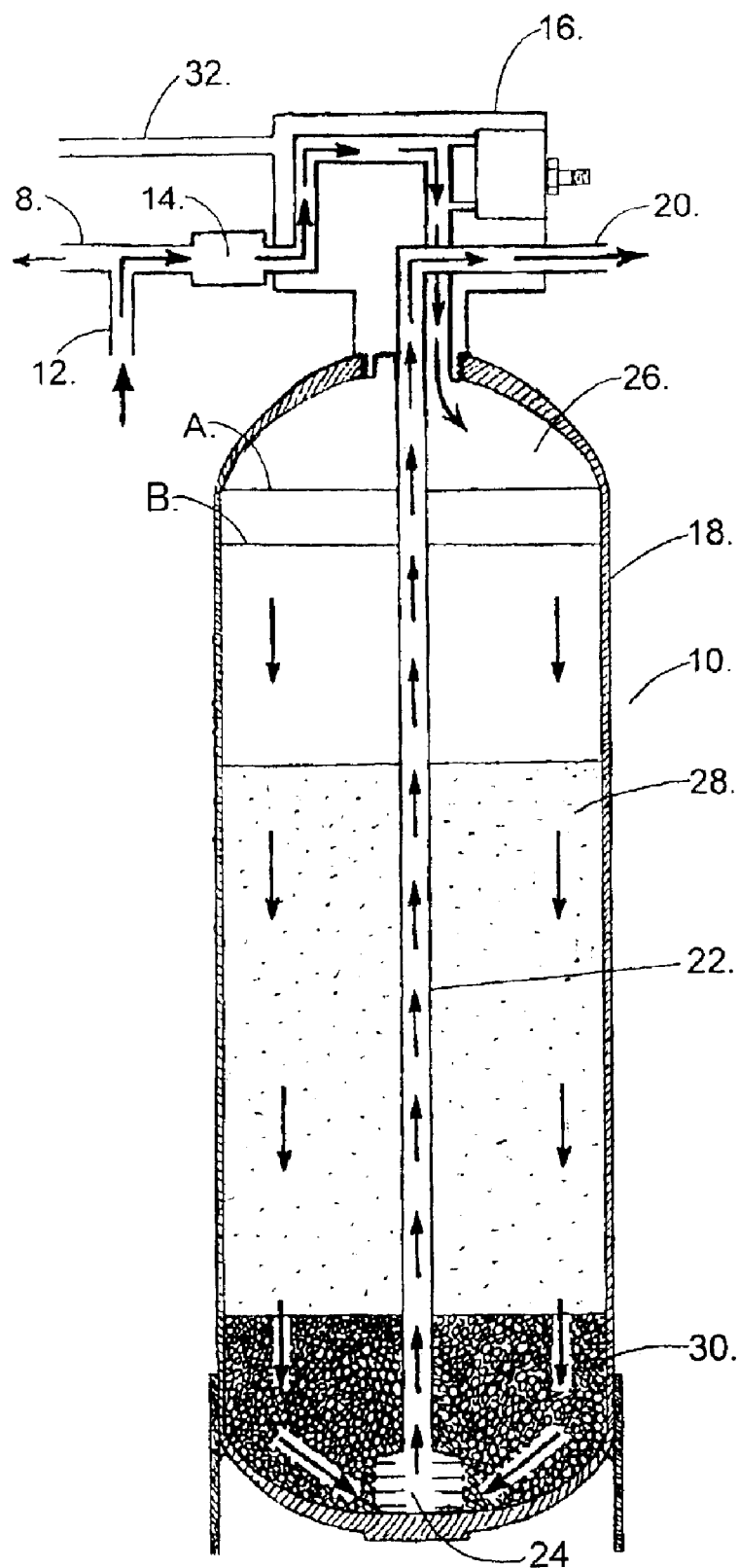
FIG. 1 is an elevation of an embodiment of the Water Treatment System of the present invention partially broken away for clarity of illustration, with arrows schematically indicating the direction of water flow during the treatment mode.

The control valve 16 attached to a treatment vessel or tank 18. Typically the control valve is threadably attached to the treatment vessel 18 at the top thereof. The treatment vessel 18 may be selected from a wide number available vessels used in well water applications such as molded fiberglass tanks manufactured by International Water Werks under their designated Model Numbers 1048 (10 inches in diameter and 48 inches in height), 1054 (10 inches in diameter and 54 inches in height) and 1248 (12 inches in diameter and 48 inches in height). The treatment vessel 18 may typically have an inside diameter of between ten and twelve inches and have an interior height of between 48 and 54 inches. As shown in FIG. 1, Line A represents the high pressure water level cut-out point of the well pump and Line B represents the low pressure water level cut-in point of the well pump. As further shown in FIG. 1, there is a pocket of compressed air 26 contained at the top of vessel 18.

Also contained within vessel 18 is filter media 28 which comprises a about 98% by weight of calcium carbonate and about 0–2% by weight of magnesium oxide. The percentage of magnesium oxide is increased as the acidity of the untreated water increases.

An example of such magnesium oxide 28 is that supplied by Martin Marietta Magnesia Specialties, Inc. of Manistee, Mich. 49660 under their MagChem label; sized prilled 30.

An example of such calcite material is the limestone (with small amounts of calcium magnesium oxide and crystalline silica quartz) supplied by Specialty Minerals of 260 Columbia Street, Adams, Mass. 01220.

Further contained within vessel 18 is a gravel type filter media 30. An outlet riser tube 22 having a strainer basket 24 at one end thereof disposed in the gravel media 30. The outlet riser tube 22 is fluidly connected at its other end to the control valve 16 and is in fluid communication with the outlet line 20 via the control valve 16.

An example of such gravel 30 is course sand supplied by Southern Products & Silica Company, Inc. of P.O. Box 189, Highway 1 N, Hoffman, N.C.; sized (31610) individual pieces ranging from about ⅛ to ¼ inches in diameter.

Typically for the aforementioned 1048 tank the air pocket 26 comprises about 0.5 cu. ft. (depending upon the air pressure): 1 to 2 lbs. of the magnesium oxide could be used with about 100 lbs. of the limestone comprising about 1 cubic feet by volume along with about 0.5 cu. ft. by volume of the gravel.

Typically for the aforementioned 1054 tank the air pocket 26 comprises about 0.5 cu. ft. (depending upon the air pressure): 1 to 2 lbs. of the magnesium oxide could be used with about 125 lbs. of the limestone comprising about 1.25 cubic feet by volume along with about 0.5 cu. ft. by volume of the gravel.

Typically for the aforementioned 1248 tank the air pocket 26 comprises about 0.5 cu. ft. (depending upon the air pressure): 1 to 2 lbs. of the magnesium oxide could be used with about 125 lbs. of the limestone comprising about 1.25 cubic feet by volume along with about 0.75 cu. ft. by volume of the gravel.

Figure 2:
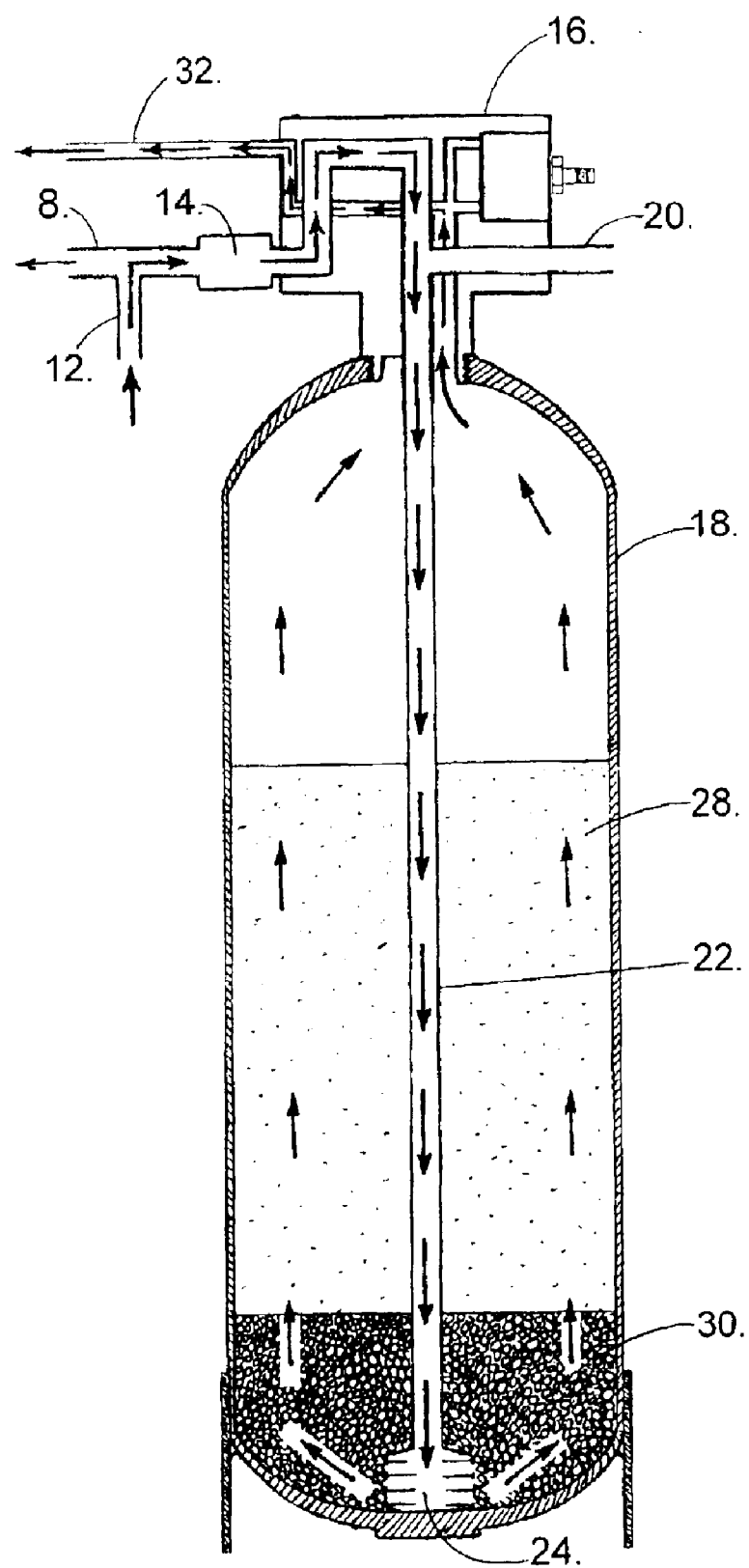
FIG. 2 is an elevation of an embodiment of the Water Treatment System of the present invention partially broken away for clarity of illustration, with arrows schematically indicating the direction of water flow during the backwash mode.
Figure 3A:
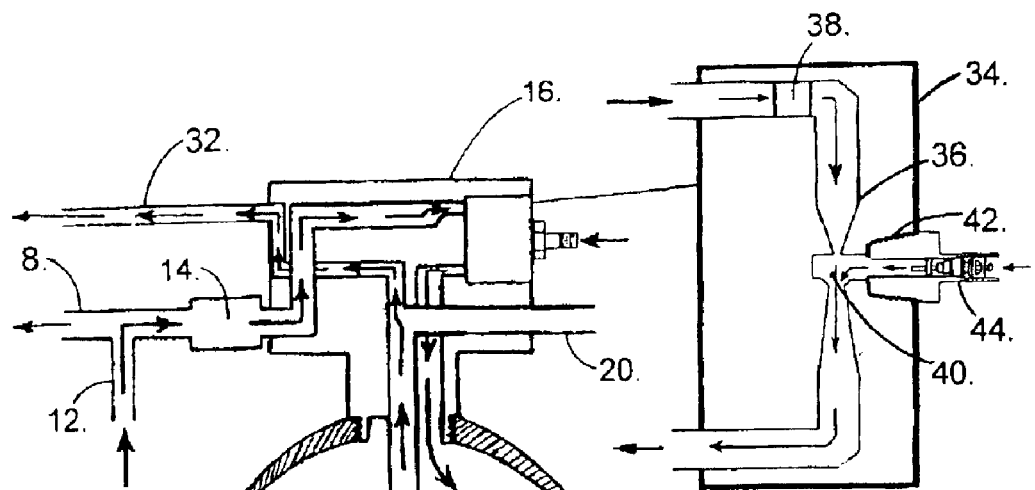
FIG. 3a is an elevation of an enlarged view of the air injection assembly of the control valve which is activated only during the air injection mode of FIG. 3 with arrows schematically indicating the direction of water and air flow during the air injection mode.
Figure 3:
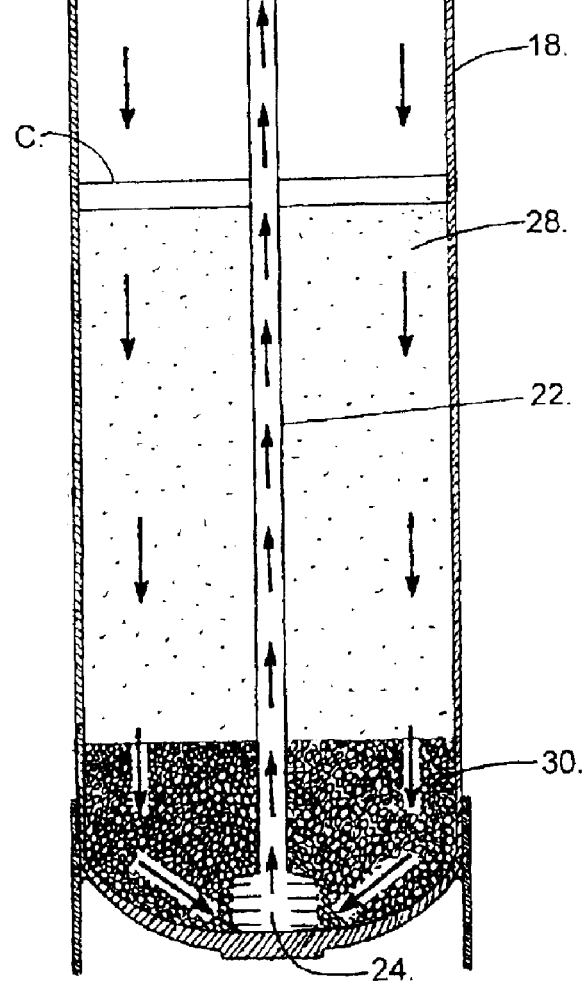
FIG. 3 is an elevation of an embodiment of the Water Treatment System of the present invention partially broken away for clarity of illustration, with arrows schematically indicating the direction of water flow during the air injection mode.
Figure 4:
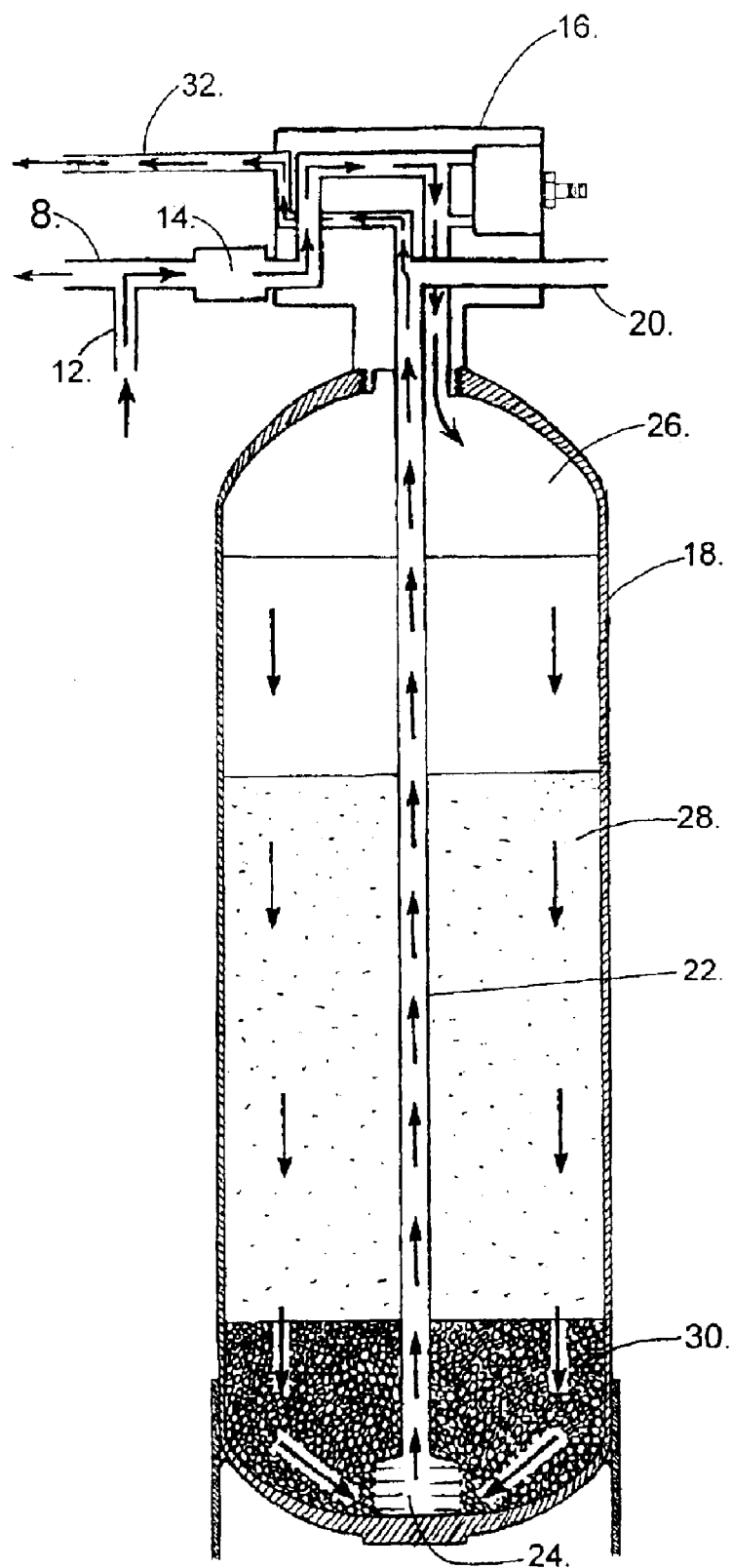
FIG. 4 is an elevation of an embodiment of the Water Treatment System of the present invention partially broken away for clarity of illustration, with arrows schematically indicating the direction of water flow during the rinse mode.

The present invention essentially comprises four modes of operation; the treatment mode as depicted in FIG. 1 and the three modes of FIGS. 2–4 which may be broadly described as the regeneration modes; i.e. the backwash mode of FIG. 2, the air injection mode of FIGS. 3 and 3a and the rinse mode of FIG. 4. Referring now to FIG. 1, the treatment mode involves drawing non-aerated water from a water source such as a well, pressurized by a pump (not shown) through inlet line 12 and check valve 14 to control valve 16. The check valve is adapted to allow fluid flow toward the control valve 16 but checks fluid flow in the opposite direction.

The control valve 16 fluidly connects the inlet line 12 and the top of the treatment vessel 18. The untreated water then flows through compressed air pocket 26. It is important to note that this is the first time the untreated water is exposed to air. Hydrogen sulfide and offensive odors are released from the well water and is captured by the air pocket 26.

It is well known that oxygen readily dissolves in water under pressure. Water just below water levels A or B accordingly contains such dissolved oxygen as well as ferrous bicarbonate and ferric oxides.

As water continues to flow, as depicted by the flow arrows in FIG. 1, the water ph is neutralized upon contact with calcite mineral filter media 28. Oxygen reacts with soluble iron compounds. The oxidation reaction of Fe++ to Fe+++ produces ferric oxides. The ferric oxides fasten to the calcite mineral 28 and accordingly, essentially all ferric oxides are caught or captured on the calcite mineral filter media 28.

Sediments in the water flow are also captured by the calcite mineral filter media 28. Filter media 30 completes the filtering process as the water flow through the strainer basket 24, up riser tube 22 and to the outlet line 20 via control valve 16. The thus treated water enters the associated potable water system (not show) with essentially every trace of iron, sulfides, odor and sediment removed. This treatment process is continuous as such treated water is drawn from the treatment vessel 18 by the demands of the associated potable water system. Typically, the treatment mode runs continuously for approximately twenty-four hours before regeneration is required. This period is controlled by the control valve 16.

Referring now to FIG. 2, the backwash mode, which could be considered as the first of the regeneration modes, begins after the treatment mode and is typically six minutes in duration at a flow rate of one gallon per minute to two gallons per minute. The flow rate will vary according to the volumetric dimensions of the treatment vessel 18 as will be further discussed below. The timing, time period, flow rate and flow patterns are controlled by the control valve 16.

As implied by the title of this mode the flow of water is reversed as depicted by the flow arrows in FIG. 2.

Non aerated water is pumped through inlet line 12 and check valve 14 to the riser tube 22 via control valve 16. The water flow continues through strainer 24 and gravel media 30. The air pocket 26, which is now saturated with hydrogen sulfide and other objectionable gases and depleted of oxygen, all occurring during the treatment mode, is released via the control valve 16, to drain pipe 32.

The filter media 28 is lifted slightly. The calcite granules that comprise the filter media 28 are in close contact rubbing and scouring each other thus removing ferric oxides that are fastened to the filter media 28. Such loosened ferric oxides are carried upward by the water flow flushed from the treatment vessel 18 to the drain pipe 32 via control valve 16.

The duration of the backwash mode can be increased later if the treatment vessel 18 is not been completely cleansed. By monitoring the discharge from the drain pipe 32 during the backwash mode it can be determined if the discharge is clear. After the Treatment System has been functioning a few weeks the backwash discharge should be clear at first then darken, turning orange or brown, depending upon the quantity of iron being removed. Thereafter the discharge from the drain line 32 should become clear again before the backwash mode is complete.

The following are examples of the backwash flow rates:

| Treatment Tank Size (diameter × height in inches) | Backwash flow rate |
| --- | --- |
| 10 × 48 | 1.0 gpm |
| 10 × 54 | 1.5 gpm |
| 12 × 48 | 2.0 gpm |

Referring now to FIG. 3 and FIG. 3a, the air injection mode, which could be considered as the second of the regeneration modes, begins after the backwash mode and is typically twenty-two minutes in duration. The flow rate will vary according to the volumetric dimensions of the treatment vessel 18. The timing, time period, flow rate and flow patterns are controlled by the control valve 16.

The air injection mode involves drawing non-aerated water from a water source such as a well, pressurized by a pump (not shown) through inlet line 12 and check valve 14 to control valve 16. Control valve closes the internal bypass (not shown) around the in-line venturi 36 contained in the injector body portion 34 of the control valve. Water flow is then directed through screen 38 for removing particulate matter in the water that clog the venturi. As water passes through the venturi 36, a pressure differential is created at the throat 40 of the venturi 36.

A bore 42 axially coextensive with the throat 40 accepts a pressure sensitive valve 44, as for example, a Schrader valve such as the type of Schrader valve employed in U.S. Pat. No. 5,147,530 to Chandler. The use of the Schrader valve is a modification to the standard issue Fleck Company Model 2510 Econominder.

The Schrader valve opens in response to the pressure differential at the throat 40 allowing for ambient air to enter the bore 42 to mix with the water flowing through the venturi 36. The air entrained water is directed by the control valve 16 to the top of the treatment vessel 18. This is the only time that any water is made to flow through the injector body 34 and its venturi 36.

Pressure inside the treatment vessel 18 quickly drops as water inside treatment vessel 18 flows down through filter media 28, gravel 30, strainer 24, riser tube 22 through control valve 16 and out drain pipe 32.

As air entrained water flows into the top of the treatment vessel 18 air is released to form air pocket 26. Water flows downward, as above discussed, and slowly rinses the lifted and loosely packed filter media 28 of untreated water present from the backwash mode. The water level is controlled by the control valve 16 to be about 1 ½ inch above the filter media 28 when the air injection mode is terminated.

Several sizes of venturis 36 are available from the manufacturer of the control valve 16, as for example from the Fleck Company. Choosing the size or flow rate of the venturi is important for optimal regeneration and effective water treatment. The following are examples of flow rates:

| Treatment Tank Size (diameter × height in inches) | Injector Venturi flow rate @ 40 p.s.i. pump pressure |
|---|---|
| 10 × 48 | .45 gpm |
| 10 × 54 | .45 gpm |
| 12 × 48 | .84 gpm |

Referring now to FIG. 4, the rinse mode, which could be considered as the third and final regeneration mode, begins after the air injection mode and is typically four minutes in duration. The flow rate will vary according to the volumetric dimensions of the treatment vessel 18. The timing, time period, flow rate and flow patterns are controlled by the control valve 16.

The rinse mode involves bypassing the air injector body 34 and the venturi 36 therein thereby compressing the air pocket 26. Drawing non-aerated water from a water source such as a well, pressurized by a pump (not shown) through inlet line 12 and check valve 14 to control valve 16, air pocket 26, filter media 28, gravel, strainer 24, riser tube 22, control valve and out the drain line 32.

The filter media 28 is compressed to tightly packed state and the pressure in the treatment vessel 18 rises to equilibrium with the pump cut-off pressure. At this point the rinse mode is terminated and the regeneration cycle is complete.

The treatment system according to this invention is ready to supply treated water completely void of iron, hydrogen sulfide, obnoxious odors, sediment and acidity to its associated potable water system.

This is accomplished without a separate aeration tank, an air regulating device or air vent, use of an air compressor, in-line cartridge filter, devices including a venturi that restrict the flow of water from the well pump to the pressure switch and pressure system.

Several tests were conducted employing the present invention on well water applications. The results of these tests, which confirm the efficacy of this invention, are as follows:

Test No. I

Untreated Well Water Analysis pH: 5.5

Ferrous Bicarbonate: 3.0 ppm

Hydrogen Sulfide: 0.10 ppm

Well Pump:: ½ hp deep well jet pump
    Maximum pressure: 35 psi
    Maximum flow rate @ 35 psi: 3 gpm Fleck 2510 Econominder control valve Treatment vessel; 10 inch diameter; 48 inch height Calcium carbonate 98%; Magnesium 2%

Backwash flow rate: 1 gpm; injector size #1*

Treated Well Water Analysis pH: 7.0

Ferrous Bicarbonate: 0.0 ppm

Ferric Hydroxide: 0.0 ppm

Hydrogen Sulfide: 0.0 ppm

Test No. II

Untreated Well Water Analysis pH: 5.8

Ferrous Bicarbonate: 7.5 ppm

Hydrogen Sulfide: 0.15 ppm

Well Pump:: ½ hp submersible pump
    Maximum pressure: 55 psi
    Maximum flow rate @ 55 psi: 12 gpm Fleck 2510 Econominder control valve Treatment vessel; 12 inch diameter; 48 inch height Calcium carbonate 99%; Magnesium 1%

Backwash flow rate: 2 gpm; injector size #2*

Treated Well Water Analysis pH: 7.0

Ferrous Bicarbonate: 0.0 ppm

Ferric Hydroxide: 0.0 ppm

Hydrogen Sulfide: 0.0 ppm

Test No. III

Untreated Well Water Analysis pH: 8.0

Ferrous Bicarbonate: 0.75 ppm

Hydrogen Sulfide: 0.05 ppm

Well Pump:: 1½ hp submersible pump
   Maximum pressure: 60 psi
   Maximum flow rate @ 60 psi: 29 gpm Fleck 2510 Econominder control valve Treatment vessel; 10 inch diameter; 54 inch height Calcium carbonate 100%

Backwash flow rate: 1.5 gpm; injector size #1*

Treated Well Water Analysis pH: 8.0

Ferrous Bicarbonate: 0.0 ppm

Ferric Hydroxide: 0.0 ppm

Hydrogen Sulfide: 0.0 ppm

*Injector specifications as found at page 27 in Fleck Co. Service Manual dated June 1995 covering, among other things, their Model 2500 Econominder Control Valve and associated parts.

While particular examples of the present invention have been shown and described, it is apparent that changes and modifications may be made therein without departing from the invention in its broadest aspects. The aim and purpose of the appended claims, therefore, is to cover all such changes and modifications as fall within the true spirit and scope of the invention.

I claim:

1. A pressurized water system comprising a single treating vessel for accepting water from a pressurized water source having a water column and a pressurized air head, substantially all hydrogen sulfide and offensive odors present in said water passing therethrough being released in said air and oxygen in said air dissolves in said water which reacts with soluble iron in said water to form ferric oxides, a controlling means substantially at the top of said treating vessel defines an inlet and an outlet for water to pass therethough and defines a drain for the purging of unwanted products removed from the treated water, said inlet connected to said pressurized water source, said outlet connected to potable water plumbing, a filter bed of calcite mineral for removing substantially all sediment present in said water and to neutralize the ph of said water and to remove substantially all said ferric oxides from said water, said ferric oxides fastening to said calcite minerals and to already fastened ferric oxides, a final filter media to remove any residual unwanted particulate matter from said water passing therethrough to said outlet, said controlling means includes a bypassable air injecting means having a water and air mixing manifold with venturi means and an axially coextensive bore for containing a pressure sensitive valve, said pressurized water flows through said venturi means to create a pressure differential at the throat of said venturi means causing said pressure sensitive valve to open in response to the pressure differential to allow for selective entrainment of ambient air in said water at said throat.

2. The pressurized water system of claim 1 wherein a filter screen means is provided upstream of said water and air mixing manifold for removing particulate matter before it enters said manifold and said pressure sensitive valve, said pressure sensitive valve being a schrader valve.

3. A pressurized water treating apparatus comprising in combination, an inlet means connecting said apparatus to a pressurized water source a including a check valving means, a treating vessel for containing a water column and a pressurized air head, substantially all hydrogen sulfide and offensive odors present in said water passing therethrough being released in said air and oxygen in said air dissolves in said water which reacts with soluble iron in said water to form ferric oxides, a controlling means substantially at the top of said treating vessel defines an inlet and an outlet for water to pass therethough and defines a drain for the purging of unwanted products removed from the treated water, said inlet connected to said pressurized water source, said outlet connected to potable water plumbing, said controlling means includes a bypassable air injecting means having a water and air mixing manifold with a venturi means and an axially coextensive bore for containing a pressure sensitive valve, said pressurized water flows through said venturi means to create a pressure differential at the throat of said venturi means causing said pressure sensitive valve to open in response to the pressure differential to allow for selective entrainment of ambient air in said water at said throat, a filter bed of calcite mineral for removing substantially all sediment present in said water and to neutralize the ph of said water and to remove substantially all said ferric oxides from said water, said ferric oxides fastening to said calcite minerals and to already fastened ferric oxides, a final filter media to remove any residual unwanted particulate matter from said water passing therethrough to said outlet, said filter bed of calcite mineral is about 98% calcium carbonate and about 0–2% magnesium oxide and said final filter media means is gravel.

4. A pressurized water treating apparatus of claim 3 wherein a check valve means is provided in the pressurized water line upstream from said controlling means.

* * * * *